United States Patent
Hayasaka et al.

(10) Patent No.: US 7,843,767 B2
(45) Date of Patent: Nov. 30, 2010

(54) OBJECT DETECTION APPARATUS AND METHOD

(75) Inventors: Shoichi Hayasaka, Susono (JP); Masato Okuda, Novi, MI (US); Hisashi Satonaka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 308 days.

(21) Appl. No.: 12/063,961

(22) PCT Filed: Aug. 29, 2006

(86) PCT No.: PCT/IB2006/002348

§ 371 (c)(1),
(2), (4) Date: Feb. 15, 2008

(87) PCT Pub. No.: WO2007/026211

PCT Pub. Date: Mar. 8, 2007

(65) Prior Publication Data

US 2008/0232198 A1    Sep. 25, 2008

(30) Foreign Application Priority Data

Sep. 2, 2005    (JP)    ............................. 2005-255323

(51) Int. Cl.
*G01S 15/93* (2006.01)
(52) U.S. Cl. ...................................... 367/99
(58) Field of Classification Search ................. 367/99, 367/104, 96, 909, 88; 342/70, 71, 903; 701/301, 701/36, 41
See application file for complete search history.

(56) References Cited

U.S. PATENT DOCUMENTS

| 7,127,339 | B2 * | 10/2006 | Iwazaki et al. | ................ 701/41 |
| 2005/0027414 | A1 * | 2/2005 | Iwazaki et al. | ................ 701/36 |
| 2007/0040835 | A1 * | 2/2007 | Hayasaka et al. | ........... 345/442 |
| 2008/0232198 | A1 * | 9/2008 | Hayasaka et al. | ............. 367/99 |

FOREIGN PATENT DOCUMENTS

| EP | 1755014 A2 * | 2/2007 |
| JP | 07 260933 | 10/1995 |
| JP | 2003 312414 | 11/2003 |
| JP | 2004 354326 | 12/2004 |
| JP | 2007052600 A * | 3/2007 |
| JP | 2007071536 A * | 3/2007 |
| WO | 03 087874 | 10/2003 |
| WO | WO 2007026211 A1 * | 3/2007 |

\* cited by examiner

*Primary Examiner*—Dan Pihulic
(74) *Attorney, Agent, or Firm*—Oblon, Spivak, McClelland, Maier & Neustadt, L.L.P.

(57) ABSTRACT

A reflection-point estimation section constituting an object detection apparatus first calculates a rotational correction angle for each estimated reflection point $P_n$ by using the following equation, using the fact that the ratio of the amount of change in a detected distance $d_n$ to a movement amount $I_n$ of a sonar is nearly equal to a tangent with respect to the direction normal to the surface of an object:

Rotational correction angle $\phi = a \tan\{(d_{n+1}-d_n)/I_n\}$ in which n is a natural number. Subsequently, the reflection-point estimation section obtains estimated reflection points $P_n'$ after correction, by rotating each estimated reflection point $P_n$ based on the calculation result.

26 Claims, 17 Drawing Sheets

POINT SEQUENCE

OBJECT DETECTION APPARATUS AND METHOD

BACKGROUND OF THE INVENTION

1. Field of the Invention

The invention relates to an object detection apparatus and an object detection method.

2. Description of Related Art

A technology for, when parking assist is performed, detecting an area in which a vehicle can be parked by detecting the distance from a parked vehicle, from a pole and the like, for example, via an ultrasonic sensor while moving, has been proposed. In general, ultrasonic sensors have a low directivity, and have a characteristic that its detection range extends with a substantially elliptical shape. For this reason, when an ultrasonic sensor detects the distances from obstacles, such as parked vehicles and poles, while moving along the obstacles, the ultrasonic sensor detects an obstacle before the ultrasonic sensor reaches the obstacle. In addition, the ultrasonic sensor still detects the obstacle after the ultrasonic sensor passes the obstacle, as long as the obstacle is within the elliptical detection range. As a result, the width of the detected obstacle becomes larger than the actual value thereof.

In order to solve such a problem, in a technology described in Japanese Patent Application Publication No. JP-A-2003-312414, a relation between a distance from an obstacle detected by an ultrasonic sensor and the error of the detected distance in the travel direction is measured in advance, and is stored as a correction amount, and the width of the obstacle is obtained by subtracting the correction amount corresponding to the detected distance from the travel distance in the vehicle travel direction. Thus, it is made possible to improve the accuracy of detecting widths of obstacles.

However, the detection range of ultrasonic sensors varies depending on the temperature, the shapes and the material of the obstacles, and variations among individual ultrasonic sensors (variation in characteristics), for example. In addition, the relation between a detected distance from an obstacle and the error thereof in the travel direction varies depending on the travel direction of the ultrasonic sensor, and the angle at which the ultrasonic sensor is attached. With regard to the technology described in Japanese Patent Application Publication No. JP-A-2003-312414, if the detection range of the ultrasonic sensor varies, and/or if the correction amount varies as the relation between the detected distance and the error thereof in the travel direction changes in this way, there is a possibility that the accuracy of detecting the position and the width of an obstacle (or an area in which a vehicle can be parked) is degraded.

SUMMARY OF THE INVENTION

It is an object of the invention to provide an object detection apparatus and an object detection method with which it is possible to detect the position and the size of an object more accurately without the influence of the fluctuation in the detection range of sensors.

An object detection apparatus according to a first aspect of the invention includes: distance detection means for transmitting a detection wave, and detecting a distance from an object that reflects the detection wave, based on a state of reflection of the detection wave; movement-amount detection means for detecting an amount of movement of the distance detection means; and reflection-point estimation means for estimating a reflection point of the detection wave based on the distance from the object detected by the distance detection means, and the movement amount of the distance detection means detected by the movement-amount detection means, wherein the reflection-point estimation means corrects the reflection point so that, when the reflection point is projected onto a travel path of the distance detection means, the projected reflection point is located further from a position of the distance detection means as a ratio of an amount of change in the distance from the object to the movement amount of the distance detection means increases.

An object detection method according to a second aspect of the invention includes: a distance detection step of transmitting a detection wave, and detecting a distance from an object by using distance detection means for detecting the distance from the object that has reflected the detection wave, based on a state of reflection of the detection wave; a movement-amount detection step of detecting an amount of movement of the distance detection means; and a reflection-point estimation step of estimating a reflection point of the detection wave based on the distance from the object detected in the distance detection step, and the movement amount of the distance detection means detected in the movement-amount detection step, wherein, in the reflection-point estimation step, the reflection point is corrected so that, when the reflection point is projected onto a travel path of the distance detection means, the projected reflection point is located further from a position of the distance detection means as a ratio of an amount of change in the distance from the object to the movement amount of the distance detection means increases.

When the distance detection means approaches an object in order to detect the distance from the object, such as a parked vehicle and a pole, while moving along the object, for example, the object is detected before the distance detection means reaches the object if the distance detection means has a characteristic that its detection range extends with a substantially elliptical shape. In such a situation where the distance detection means is positioned this side of the object, and the detection wave is reflected by an edge portion of the object, since the movement amount of the reflection point relative to the movement amount of the detection means is small, the detected distance becomes small as the detection means travels. The larger the distance between the distance detection means and the object is, the stronger this tendency is. In other words, the larger the distance between the distance detection means and the object is, the greater the ratio of the amount of change in the detected distance to the movement amount of the distance detection means becomes. On the other hand, if the detection means passes by the side of the object substantially along the object, the ratio of the amount of change in the detected distance to the movement amount of the detection means is substantially constant.

According to the object detection apparatus or the object detection method of the invention, the reflection point of the detection wave projected onto the travel path of the distance detection means is corrected to a point further from the position of the detection means as the ratio of the amount of change in the distance from the object to the movement amount of the distance detection means increases, and, in this way, the reflection point of the detection wave is estimated. Thus, it is made possible to detect the position and the size of an object more accurately without the influence of the fluctuation in the detection range of the distance detection means.

It is advantageous that the reflection-point estimation means corrects the reflection point so that an angle between the travel path of the distance detection means and a straight line connecting the position of the distance detection means and the reflection point is made smaller as the ratio of the amount of change to the movement amount increases.

It is advantageous that, in the reflection-point estimation step, the reflection point is corrected so that an angle between the travel path of the distance detection means and a straight line connecting the position of the distance detection means and the reflection point is made smaller as the ratio of the amount of change to the movement amount increases.

In this case, the reflection point of the detection wave can be determined by performing rotational correction of the reflection points so that the angle between the travel path of the distance detection means and the straight line connecting the position of the distance detection means and the reflection point is made smaller as the ratio of the amount of change in the detected distance to the movement amount of the distance detection means increases, using the fact that the ratio of the amount of change to the movement amount is nearly equal to the tangent with respect to the direction normal to the surface of the object.

It is advantageous that, if the reflection point after correction is not within a range in which detection can be performed by the distance detection means, the reflection-point estimation means judges that a detection result is incorrect.

It is advantageous that, in the reflection-point estimation step, if the reflection point after correction is not within a range in which detection can be performed by the distance detection means, the detection result is judged to be incorrect.

The reflection point cannot exist out of the range in which detection can be performed by the distance detection means. For this reason, by judging the detection result to be incorrect when the reflection point after correction is not within the range in which detection can be performed by the distance detection means, it is possible to prevent erroneous detection.

It is advantageous that the reflection-point estimation means assumes an outermost reflection point after correction with respect to a travel direction of the distance detection means as an edge point of the object.

It is advantageous that, in the reflection-point estimation step, an outermost reflection point after correction with respect to a travel direction of the distance detection means is assumed as an edge point of the object.

By adopting these features, it is made possible to prevent a width or the like of the object from being less than the real value thereof when the width or the like of the object is determined based on the reflection points after correction.

It is advantageous that, if the distance from the object detected by the distance detection means is equal to or greater than a predetermined value, the reflection-point estimation means does not correct the reflection point.

It is advantageous that, in the reflection-point estimation step, if the distance from the object detected by the distance detection means is equal to or greater than a predetermined value, the reflection point is not corrected.

If the distance between the distance detection means and the object is large, there is a possibility that the number of obtained distance data of the edge portion of the object decreases, and, at the same time, the variation in the measurement errors increases. Even in this case, it is possible to keep the correction from being performed in an inappropriate state because the correction of the reflection points is stopped.

It is advantageous that the object detection apparatus according to the invention further includes data-number prediction means for predicting a number of distance data corresponding to the object to be detected by the distance detection means, wherein, if the number of distance data predicted by the data-number prediction means is equal to or less than a predetermined number, the reflection-point estimation means does not correct the reflection point.

It is advantageous that the object detection method according to the invention further includes a data-number prediction step of predicting a number of distance data corresponding to the object to be detected by the distance detection means, wherein, in the reflection-point estimation step, if the number of distance data predicted in the data-number prediction step is equal to or less than a predetermined number, the reflection point is not corrected.

If the number of the distance data predicted to be obtained is less than the predetermined number, the correction of the reflection points is stopped, so that it is possible to keep correction from being performed in an inappropriate state.

The data-number prediction means may predict the number of distance data to be detected by the distance detection means, based on a detection cycle of the distance detection means, a travel speed of the distance detection means, and a size of the object.

In the data-number prediction step, the number of distance data to be detected by the distance detection means may be predicted based on a detection cycle of the distance detection means, a travel speed of the distance detection means, and a size of the object.

It is advantageous that the object detection apparatus according to the invention further includes data-range prediction means for predicting a data range of the distance data corresponding to the object to be detected by the distance detection means, wherein, if the data range predicted by the data-range prediction means is equal to or smaller than a predetermined value, the reflection-point estimation means does not correct the reflection point.

It is advantageous that the object detection method according to the invention further includes a data-range prediction step of predicting a data range of the distance data corresponding to the object to be detected by the distance detection means, wherein, in the reflection-point estimation step, if the data range predicted in the data-range prediction step is equal to or smaller than a predetermined value, the reflection point is not corrected.

When the data range of distance data corresponding to the object to be detected by the distance detection means is predicted to be smaller than the predetermined value, it is presumed that the number of obtained distance data is also small. Even in this case, it is possible to keep the correction from being performed in an inappropriate state because the correction of the reflection points is stopped.

The data-range prediction means may predict the data range, based on a detection cycle of the distance detection means, a travel speed of the distance detection means, and a size of the object.

In the data-range prediction step, the data range may be predicted based on a detection cycle of the distance detection means, a travel speed of the distance detection means, and a size of the object.

According to the invention, the reflection point of the detection wave projected onto the travel path of the distance detection means is corrected to a point further from the position of the detection means as the ratio of the amount of change in the distance to the movement amount of the distance detection means increases. Thus, it is made possible to detect the position and the size of an object more accurately without the influence of the fluctuation in the detection range of the distance detection means.

BRIEF DESCRIPTION OF THE DRAWINGS

The foregoing and further objects, features and advantages of the invention will become apparent from the following description of example embodiments with reference to the accompanying drawings, wherein the same or corresponding portion are denoted by the same reference numerals and wherein.

DETAILED DESCRIPTION OF THE PREFERRED EMBODIMENTS

Figure 1:
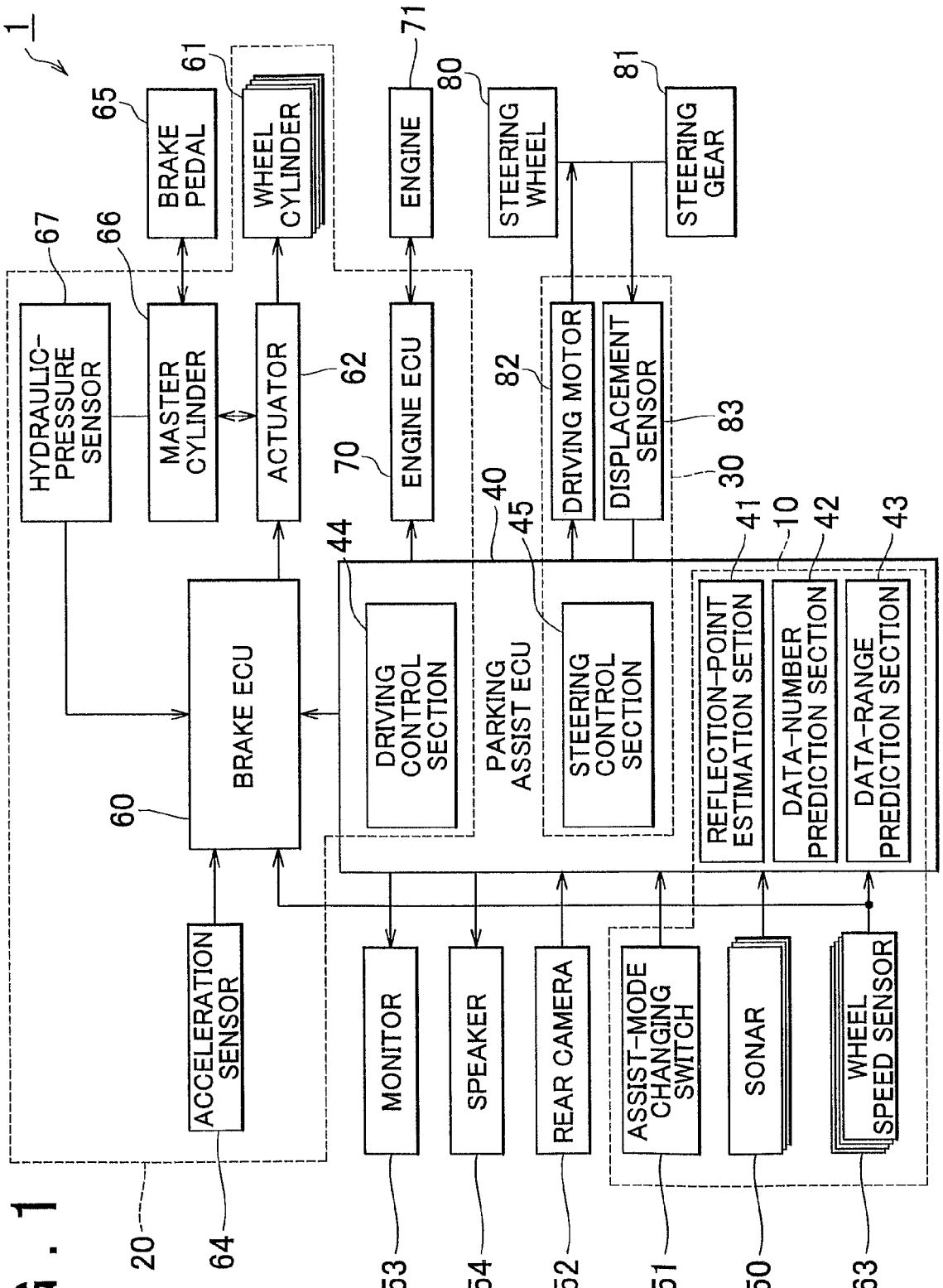
FIG. 1 is a block diagram showing a configuration of a parking assist system including an object detection apparatus of an embodiment of the invention.

Detailed description will be given below of preferred embodiments of the invention with reference to the drawings. The same or corresponding portions are denoted by the same reference numerals in the drawings. In this description, an object detection apparatus of the embodiment will be explained by taking, as an example, a case where the invention is applied to a parking assist system for assisting the movement of a vehicle to a preset, desired parking position by automatic steering or by steering assist.

First of all, description will be given of a configuration of a parking assist system 1 including the object detection apparatus 10 of the embodiment with reference to FIG. 1. FIG. 1 is a block diagram showing the configuration of the parking assist system 1 including the object detection apparatus 10.

The parking assist system 1 assists the operation to park in a garage or the operation to perform parallel parking by using the image of a rear area of the vehicle, which is displayed on a monitor screen, and the voice navigation, and, in addition, by performing steering control. The parking assist system 1 includes the object detection apparatus 10, a driving control system 20, and an automatic steering system 30, and is controlled by a parking assist ECU 40 that is an electronic control unit. The parking assist ECU 40 includes a CPU, a ROM, a RAM, an input signal circuit, an output signal circuit, a power supply circuit, and others. The parking assist ECU 40 includes: a reflection-point estimation section 41, which controls the object detection apparatus 10; a data-number prediction section 42; a data-range prediction section 43; a driving control section 44, which controls the driving control system 20; and a steering control section 45, which controls the automatic steering system 30. The reflection-point estimation section 41, the data-number prediction section 42, the data-range prediction section 43, the driving control section 44, and the steering control section 45 may be individually realized by hardware in the parking assist ECU 40. Alternatively, these sections may be realized by software, while, concerning hardware, the same CPU, the same ROM, the same RAM and others are used.

The parking assist ECU 40 combines an image of a rear area of the vehicle, and an image of guiding lines created by performing calculation and making predictions based on positional information of parked vehicles and the like to be supplied from the object detection apparatus 10, and vehicle-state signals to be supplied from the driving control system 20 and the automatic steering system 30, and then displays the combined image on the monitor screen. In addition, the parking assist ECU 40 performs various controls for parking assist by outputting control signals to the automatic steering system 30 and the driving control system 20 according to the above-mentioned information and signals.

A sonar 50 for detecting objects, such as the parked vehicles, is disposed in the vehicle in which the parking assist system 1 is installed. The output from the sonar 50, such as the distance from the parked vehicle or the like, is supplied to the parking assist ECU 40. The sonar 50 periodically transmits ultrasonic waves (detection waves), and determines the presence of objects, such as the parked vehicles, based on the time from the transmission of the ultrasonic wave to reception of the reflected wave thereof. If there is an object, the sonar 50 is used to determine the distance from the object. In other words, the sonar 50 functions as distance detection means. A laser radar or the like may be used instead of the sonar 50.

An assist-mode changing switch 51 that is operated by a driver to make a selection between a parallel-parking assist mode and a parking-in-garage assist mode when parking assist is performed, a rear camera 52 for capturing the image of a rear area of the vehicle, and wheel speed sensors 63 for detecting wheel speeds of wheels are connected to the parking assist ECU 40. Thus, the output signal from the assist-mode changing switch 51, the image signal acquired via the rear camera 52, and the output signals from the wheel speed sensors 63 are supplied to the parking assist ECU 40. The parking assist ECU 40 calculates vehicle speed based on the output from the wheel-speed sensors 63, and calculates the moving distance of the vehicle, that is, the travel distance of the sonar 50 attached to the vehicle, per a predetermined period of time, based on the calculated vehicle speed. In this way, the wheel speed sensors 63 and the parking assist ECU 40 function as movement-amount detection means. In addition, a monitor 53 for displaying information to the driver in the form of images, and a speaker 54 for providing information in the form of voice are connected to the parking assist ECU 40.

The object detection apparatus 10 includes the reflection-point estimation section 41, the data-number prediction section 42, the data-range prediction section 43, the sonar 50, the assist-mode changing switch 51 and the wheel speed sensors 63 described above.

The reflection-point estimation section 41 estimates the position and the size of the object by detecting the distance from the object, such as a parked vehicle, while moving along the object, when parking assist is performed. The reflection-point estimation section 41 estimates the reflection point of the ultrasonic wave transmitted by the sonar 50, based on the distance (hereinafter referred to as "the detected distance") from the object detected by the sonar 50, and the movement amount of the sonar 50. At this time, the reflection-point estimation section 41 corrects the reflection point (hereinafter referred to as "the rotational correction") so that the angle between the travel path of the sonar 50 and the straight line connecting the position of the sonar 50 and the reflection point is made smaller as the ratio of the amount of change in the detected distance to the movement amount of the sonar 50 increases. In this way, the reflection point is corrected so that, when the reflection point is projected onto the travel path of the sonar 50, the projected reflection point is located further from the position of the sonar 50 as the ratio of the amount of change in the detected distance to the movement amount of the sonar 50 increases. In other words, the reflection-point estimation section 41 functions as reflection-point estimation means.

As preprocessing to perform the above-described rotational correction, the reflection-point estimation section 41 approximates the point sequence showing the position of the object obtained from the output from the sonar 50 by a straight line or a curve. In this embodiment, RANSAC (Random Sample Consensus) is used as an algorithm for approximating a point sequence by a straight line or a curve. RANSAC is an algorithm that first selects a required minimum number of data from among all the data at random, and then calculates parameters of the constraint. Next, the validity of the obtained values of the parameters is evaluated based on the remaining data. The above process is repeated sufficiently many times, and, thereafter, the values that gave the best result of the evaluation, and the data that support the values are retrieved. In this way, both correct parameters and correct data are simultaneously estimated.

More specifically, when performing the approximation, the reflection-point estimation section 41 repeatedly performs random setting of a candidate of an approximation straight line, and evaluation of approximation accuracy of the candidate of the approximation straight line, using the distances between the candidate of the approximation line and the points constituting the point sequence, and selects the candidate of the approximation line with the best result of the evaluation of approximation accuracy as the approximation line.

Figure 2:
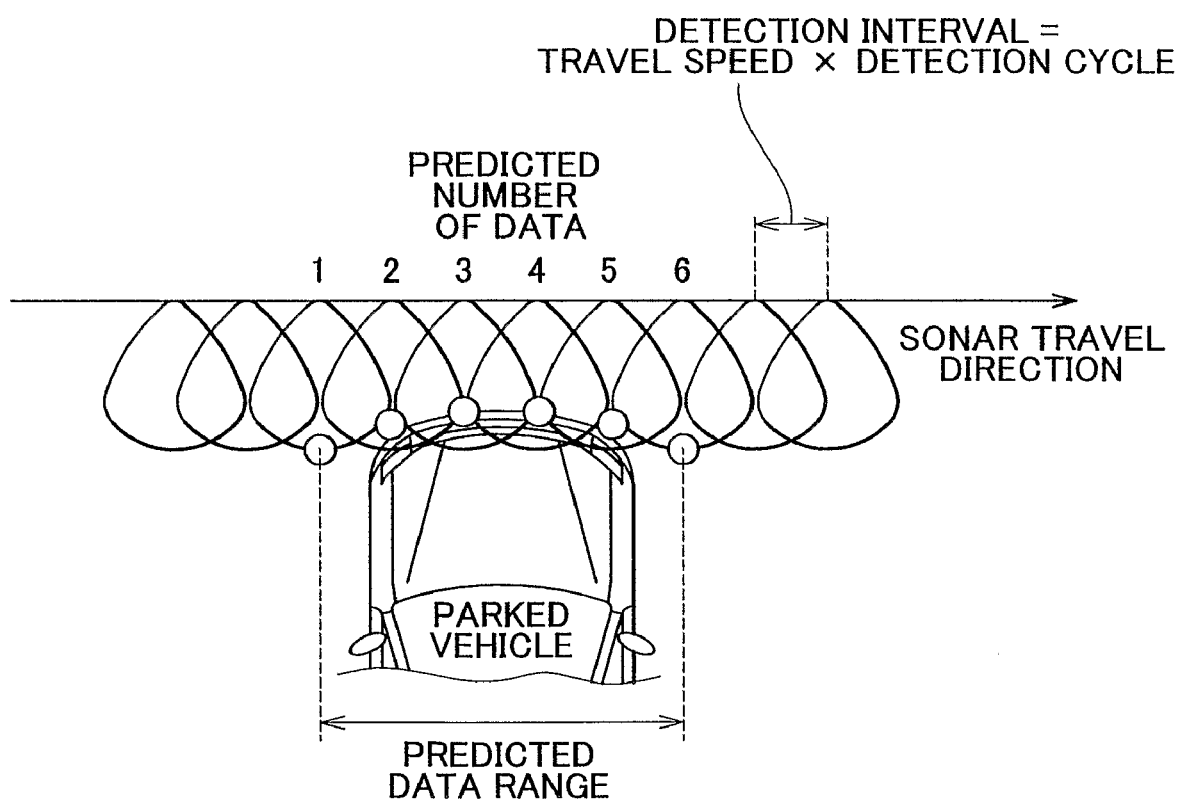
FIG. 2 is a schematic diagram for explaining a method of calculating the number of data and a data range.

The data-number prediction section 42 predicts the number of distance data corresponding to the object to be detected by the sonar 50, based on the detection cycle and the travel speed of the sonar 50, as well as the size of the object. Specifically, as schematically shown in FIG. 2, detection intervals are calculated by multiplying the detection cycle by the travel speed of the sonar 50, and the size of the object is divided by the obtained detection interval, whereby the number of the distance data is predicted. The reflection-point estimation section 41 does not perform the rotational correction of the reflection point when the number of the distance data predicted by the data-number prediction section 42 is less than a predetermined number. It should be noted that the predetermined number to be used as a criterion for determining whether to perform the rotational correction is set based on actual measurement data and the like, considering, as a criteria, whether the rotational correction can be properly performed.

Figure 3:
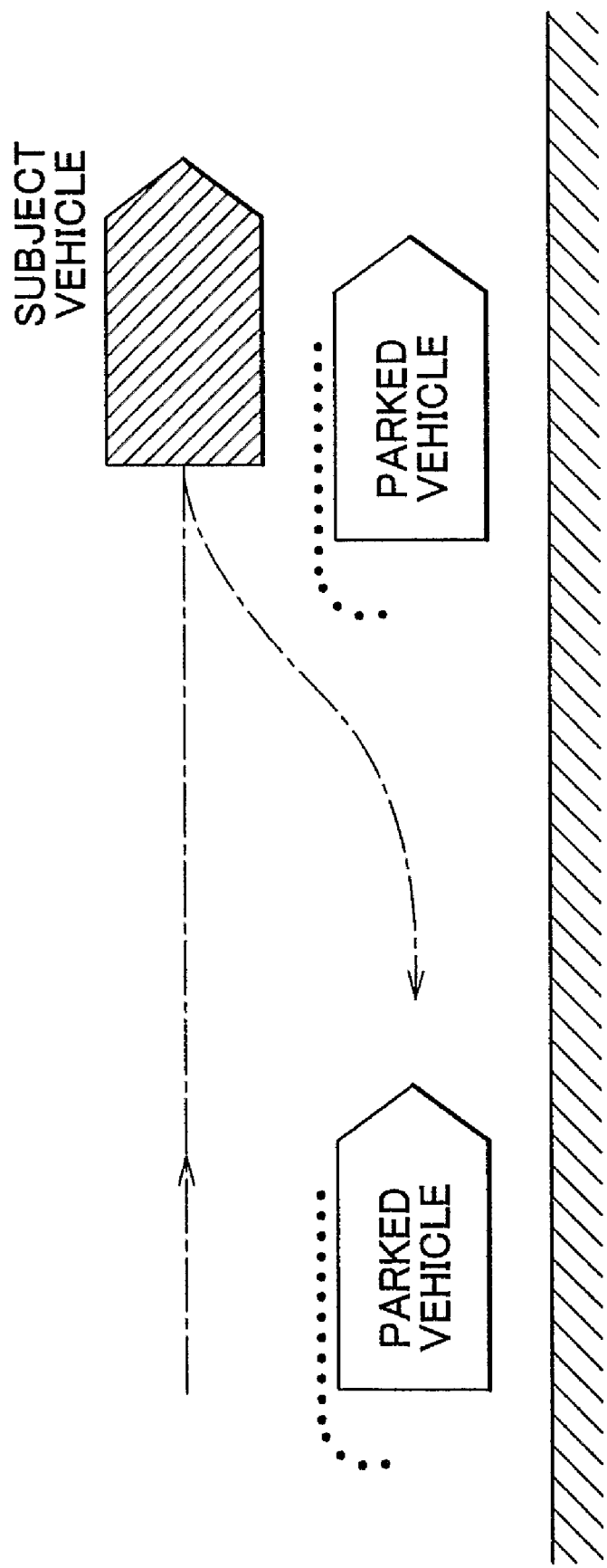
FIG. 3 is a diagram showing a travel path of a subject vehicle, in which the parking assist system is installed, taken when a parallel-parking assist is performed.

Since the travel speed of the sonar 50 is equal to the travel speed of the vehicle in which the sonar 50 is installed, the vehicle speed obtained from the detection signals from the vehicle speed sensors 63 is used as the travel speed of the sonar 50. The size of the object to be detected is predicted depending on the state of the assist-mode changing switch 51, for example. More specifically, as show in FIG. 3, when the parallel-parking assist mode, with regard to which the vehicle in which the parking assist system 1 is installed (herein also referred to as "the subject vehicle") passes by the side of a parked vehicle, is selected, an average total length of a vehicle (about 4.7 m, for example) is set as the size of the object to be detected. FIG. 3 is a diagram showing a travel path of the subject vehicle taken when a parallel-parking assist is performed.

Figure 4:
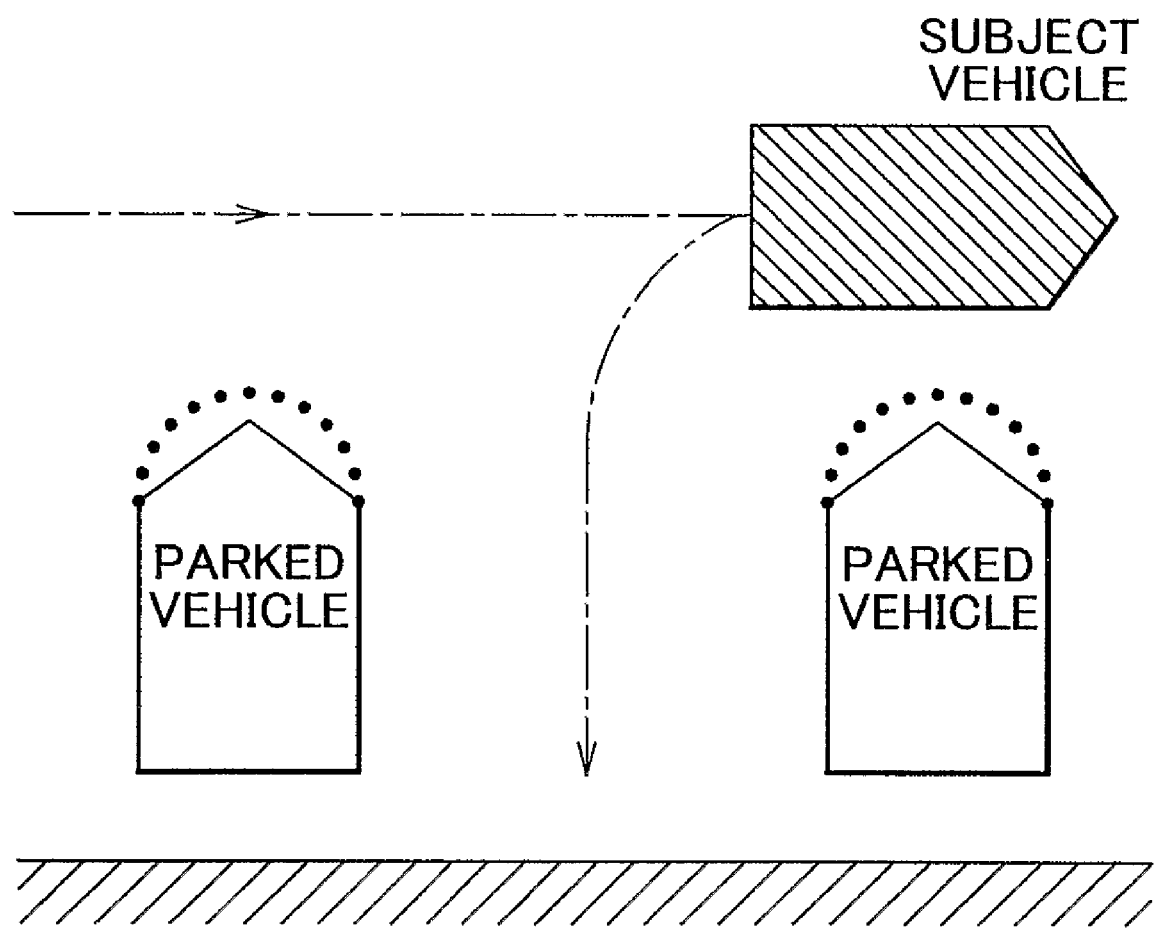
FIG. 4 is a diagram showing a travel path of the subject vehicle taken when a parking-in-garage assist is performed.

On the other hand, as shown in FIG. 4, when the parking-in-garage assist mode, with regard to which the subject vehicle passes the front or the rear of a parked vehicle, is selected, an average width of a vehicle (about 1.7 m, for example) is set as the size of the object to be detected. FIG. 4 is a diagram showing a travel path of the subject vehicle taken when a parking-in-garage assist is performed. Thus, the data-number prediction section 42, the vehicle speed sensors 63, and the assist-mode changing switch 51 function as data-number prediction means.

As schematically shown in FIG. 2, the data-range prediction section 43 predicts the data range corresponding to the detected object, based on the detection cycle and the travel speed of the sonar 50, as well as the size of the object. The reflection-point estimation section 41 does not perform the rotational correction of the reflection point when the data range predicted by the data-range prediction section 43 is smaller than a predetermined value. It should be noted that the predetermined value to be used as a criterion for determining whether to perform the rotational correction is set based on actual measurement data and the like, considering, as a criteria, whether the rotational correction can be properly performed. As described above, the vehicle speed obtained from the detection signals from the vehicle speed sensors 63 is used as the travel speed of the sonar 50, and the size of the object to be detected is set depending on the state of the assist-mode changing switch 51. Thus, the data-range prediction section 43, the vehicle speed sensors 63, and the assist-mode changing switch 51 function as data-range prediction means.

The driving control system 20 includes the above-described driving control section 44, a braking system, and a driving system. The braking system is an electronically controlled braking (ECB) system that electronically controls the braking force to be applied to the wheels via a brake ECU 60. The braking system has a function of independently regulating the braking force to be applied to the wheels by regulating, via actuators 62, the hydraulic pressure supplied to wheel cylinders 61 of hydraulic brakes installed in the wheels.

The output signal from an accelerometer 64 for detecting the acceleration of the vehicle, the output signals from a group of hydraulic-pressure sensors (not shown), which are disposed in the actuators 62, for detecting the hydraulic pressure in the actuators 62 and the hydraulic pressure supplied to the wheel cylinders 61, and the output signal from a master-cylinder hydraulic-pressure sensor 67 for detecting the hydraulic pressure in a master cylinder 66, which is connected between a brake pedal 65 and the actuators 62, are supplied to the brake ECU 60. In addition, the output signals from the above-described wheel speed sensors 63 are supplied to the brake ECU 60.

An engine ECU 70 controls an engine 71 constituting the driving system. The engine ECU 70 and the brake ECU 60 perform cooperative control by transmitting and receiving information to and from the driving control section 44.

The automatic steering system 30 includes: a driving motor 82 that also functions as a power steering apparatus, which driving motor is disposed between a steering wheel 80 and a steering gear 81; and a displacement sensor 83 for detecting the amount of displacement of the steering wheel. The steering control section 45 controls the driving of the driving motor 82, and receives the output signal from the displacement sensor 83.

Figure 5A:
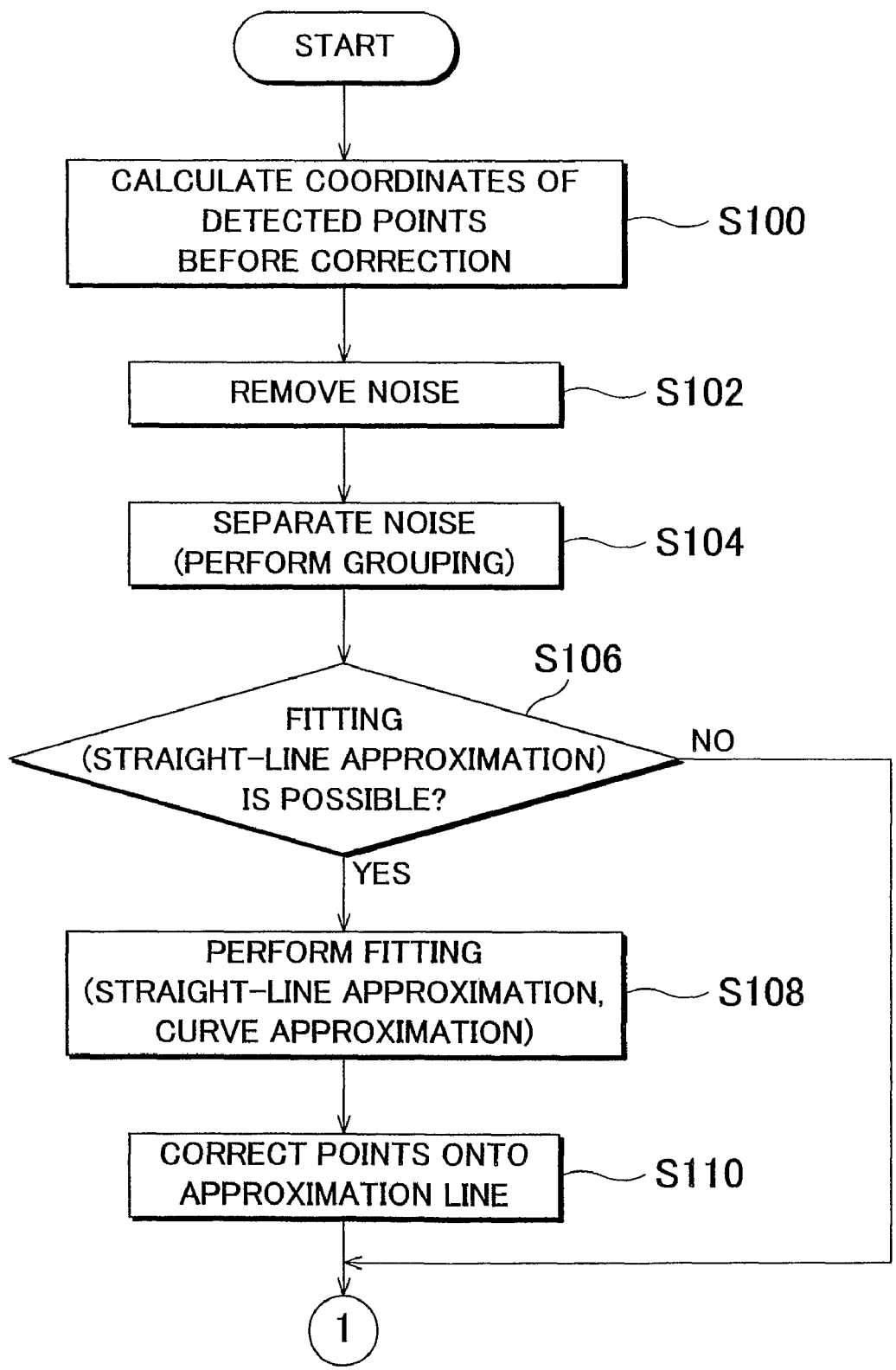
FIG. 5 is a flow chart showing a procedure of an object detection process.
Figure 5B:
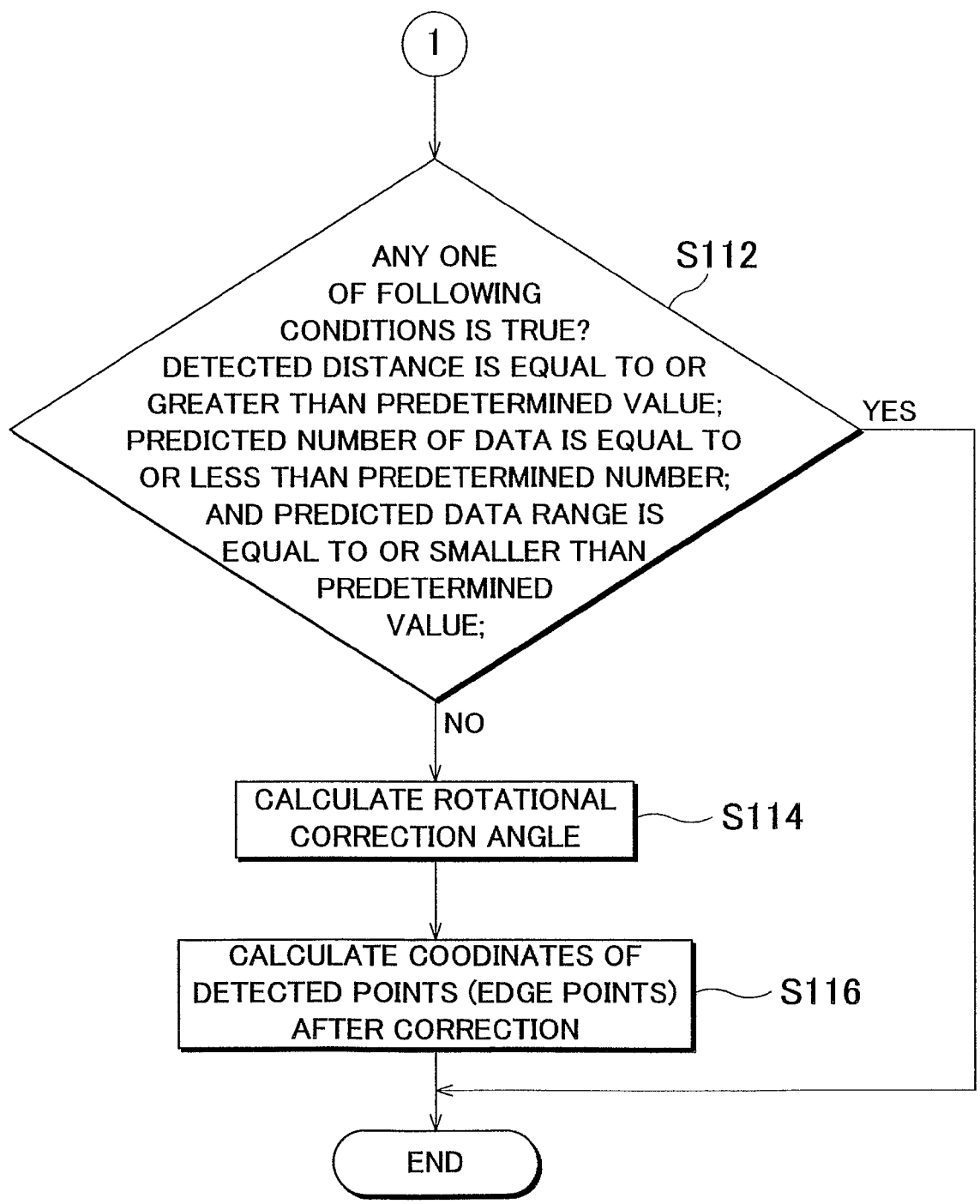

Next, with reference to FIG. 5, description will be given of an operation of the object detection apparatus 10 carried out while the parking assist control is performed, and a object detection method, by taking, as an example, a case where the parking assist is carried out by the parking assist system 1. FIG. 5 is a flow chart showing a procedure of an object detection process carried out while the parking assist control is performed. This process is repeatedly performed from the time of turning on the power of the parking assist ECU 40 to the time of turning off the power thereof at predetermined intervals.

Figure 6:
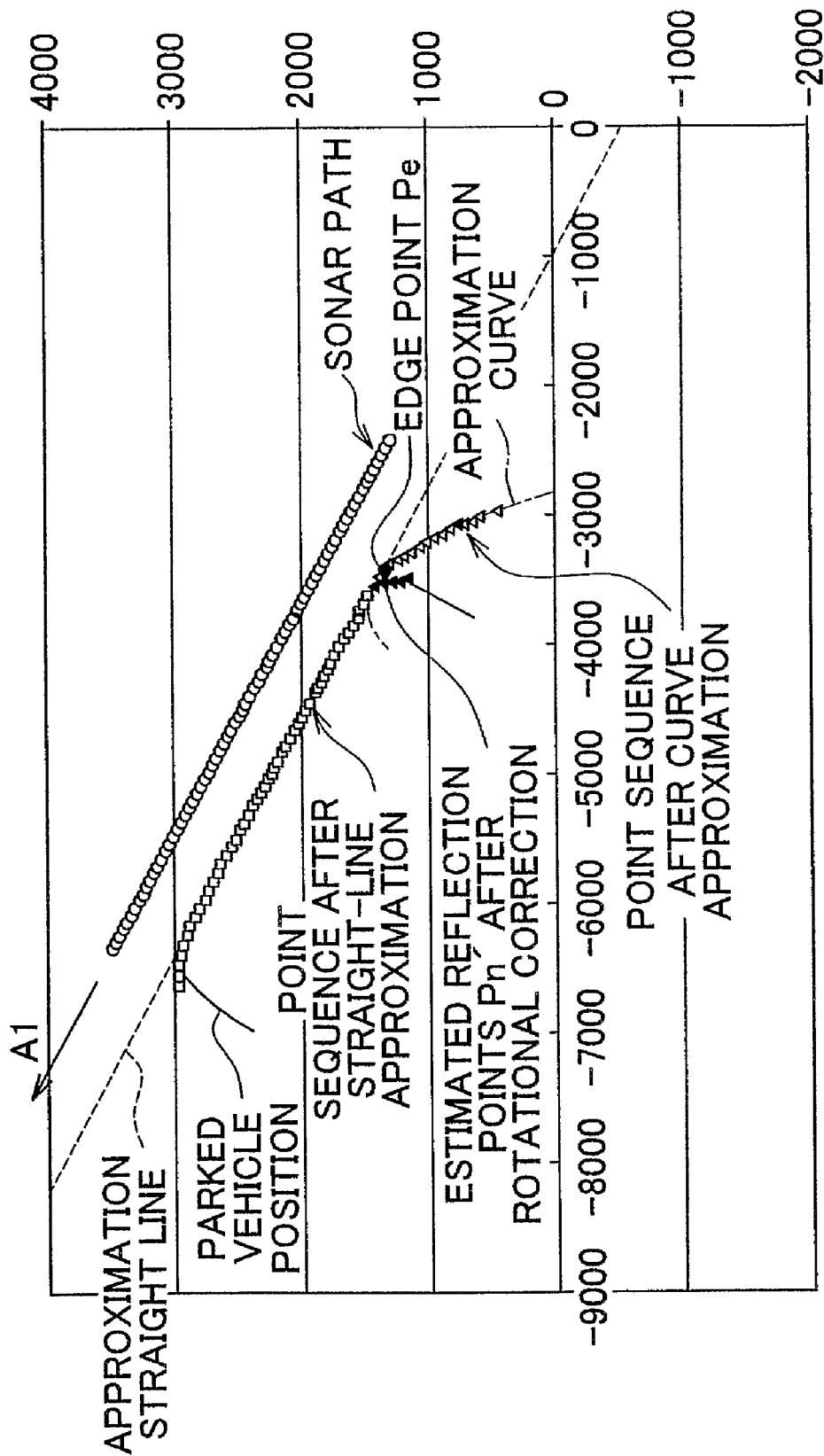
FIG. 6 is a diagram showing an example of a point sequence obtained from the detection results outputted from a sonar, and an example of a point sequence after rotational correction.

In step S100, the coordinates of each of the detected points (estimated reflection points) are determined based on each detection result outputted from the sonar 50. An example of the point sequence constituted of the estimated reflection points obtained from the detection results outputted from the sonar 50 is shown in FIG. 6. The vertical axis and the horizontal axis in FIG. 6 represent coordinates for identifying positions. In FIG. 6, the marks "○" show a path of the sonar 50, more specifically, a path taken when the vehicle in which the sonar 50 is installed travels in a direction from a position corresponding to a lower right portion of FIG. 6 toward a position corresponding to an upper left portion thereof (the direction indicated by the arrow A1) along the side face of the parked vehicle. On the other hand, the marks "□" in FIG. 6 represent the reflection points estimated based on the result of detection that is performed while the sonar 50 travels along the travel path. With regard to this embodiment, the point distant, by the detected distance, from the subject vehicle in the direction perpendicular to the travel direction of the subject vehicle is defined as the estimated reflection point. The solid line in FIG. 6 indicates the actual position of the parked vehicle.

Figure 7:
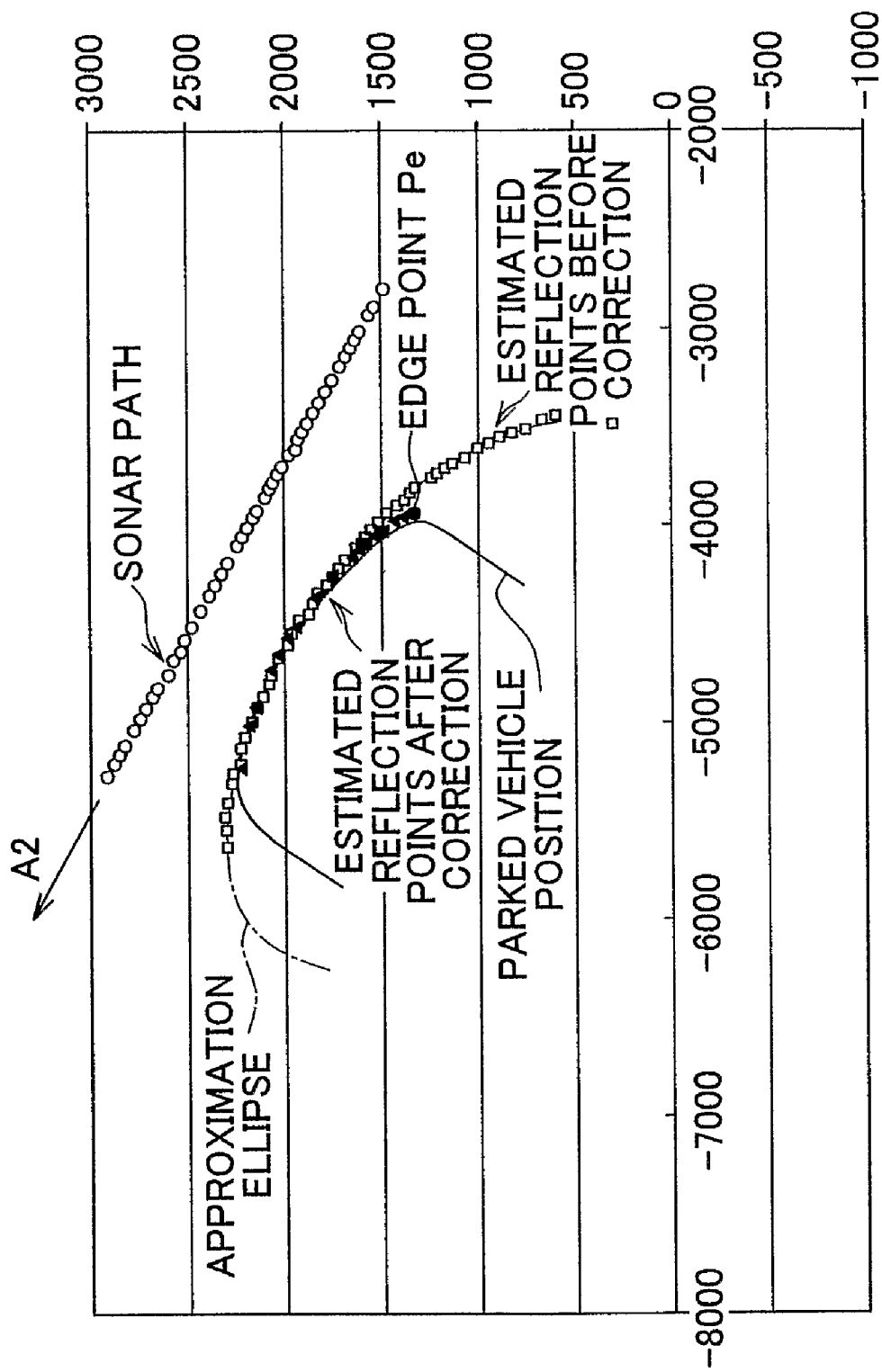
FIG. 7 is a diagram showing another example of a point sequence obtained from the detection results outputted from the sonar, and another example of a point sequence after rotational correction.

Another example of the point sequence constituted of the estimated reflection points obtained from the detection results outputted from the sonar 50 is shown in FIG. 7. The vertical axis and the horizontal axis in FIG. 7 represent coordinates for identifying positions. In FIG. 7, the marks "○" show a path of the sonar 50, more specifically, a path taken when the vehicle in which the sonar 50 is installed travels in a direction from a position corresponding to a lower right portion of FIG. 7 toward a position corresponding to an upper left portion thereof (the direction indicated by the arrow A2) along the front face of the parked vehicle. On the other hand, the marks "□" in FIG. 7 represent the reflection points estimated based on the result of detection that is performed while the sonar 50 travels along the travel path The method of estimation is the same as that used in the above case shown in FIG. 6.

Figure 8:
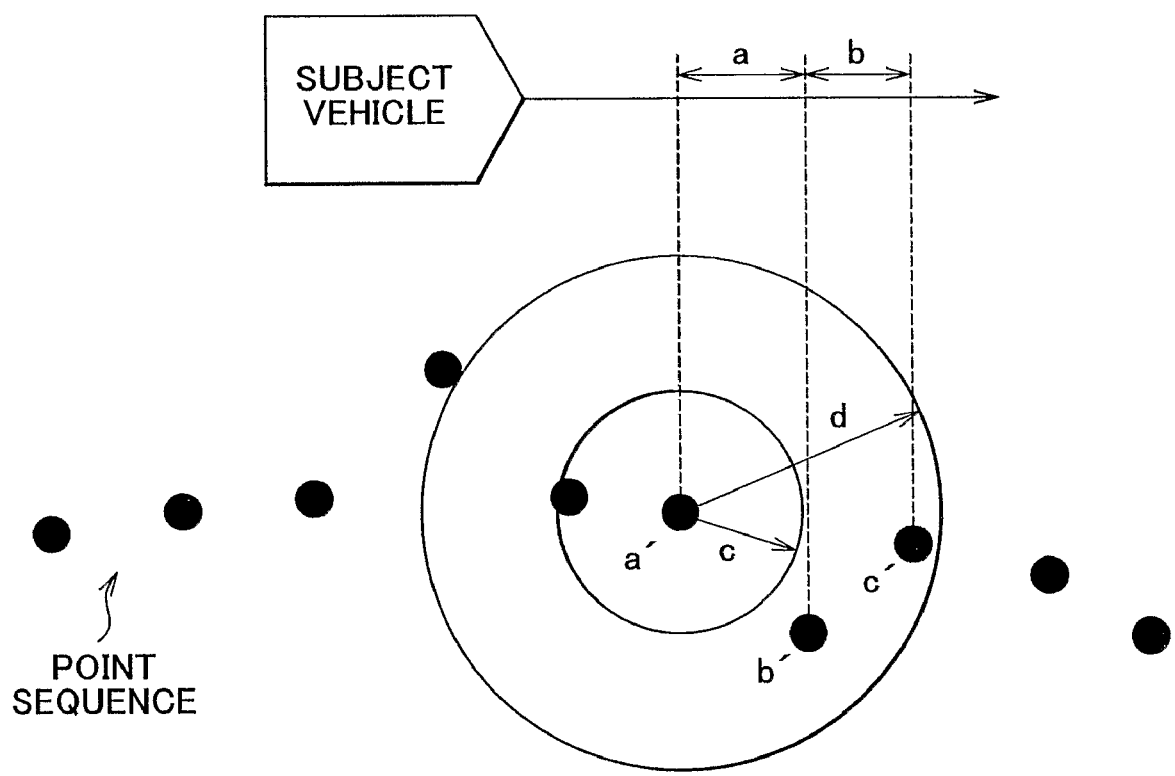
FIG. 8 is a diagram for explaining a method of removing noise.

In step S102, noise is removed from the point sequence constituted of the estimated reflection points, which have been obtained in step S100. Description will now be given of a method of removing noise with reference to FIG. 8. In removing noise, the coordinate data of n consecutive points (three points a', b' and c' in FIG. 8) are acquired, and it is determined whether each point is within a valid area that is set according to the moving distance of the subject vehicle from a reference point. The points that are not within the valid area are judged to be noise, and are therefore removed.

More specifically, using the following equation (1), a valid area c with the reference point a' is calculated according to a moving distance a of the subject vehicle:

$$c = A \times a \tag{1}$$

where A is a constant.

Subsequently, it is determined whether the point b' is within the valid area c with the reference point a'. If the point b' is not within the valid area c, the point b' is judged to be noise and is therefore removed. On the other hand, if the point b' is within the valid area c, the point b' is treated as a valid data.

Then, a valid area d corresponding to a moving distance (a+b) of the subject vehicle is calculated by using the following equation (2).

$$d = A \times (a+b) \tag{2}$$

Thereafter, it is determined whether the point c' is within the valid area d with the reference point a'. If the point c' is not within the valid area d, the point c' is judged to be noise, and is therefore removed. On the other hand, if the point c' is within the valid area d, the point c' is treated as a valid data.

The above-described process for removing noise is sequentially repeated for the other points constituting the point sequence, so that noise is removed from the detection results point sequence) outputted from the sonar 50.

Figure 9:
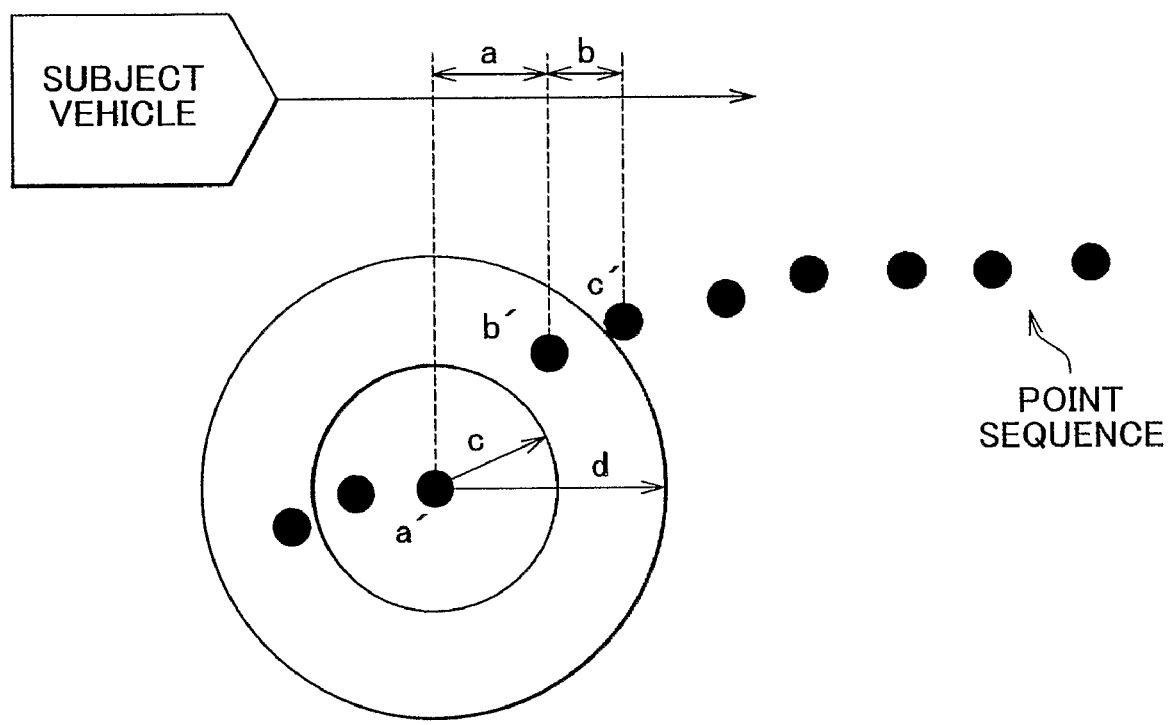
FIG. 9 is a diagram for explaining a grouping method.

Referring back to FIG. 5, in step S104, grouping of the point sequence is performed. Referring to FIG. 9, description will now be given of a method of grouping the point sequence. In a grouping process, the coordinate data of n consecutive points (three points a', b' and c' in FIG. 9) are acquired, and it is determined whether each point is within a valid area that is set according to the moving distance of the subject vehicle from a reference point. If there are consecutive points that are not within the valid area, the point sequence is divided at the reference point, and the point sequences into which the original point sequence is divided are separated, and are treated as different groups.

More specifically, using the above equation (1), a valid area c with the reference point a' is calculated according to a moving distance a of the subject vehicle, and a valid area d corresponding to a moving distance (a+b) of the subject vehicle is calculated by using the above equation (2).

Thereafter, it is determined whether the point b' is within the valid area c with the reference point a', and it is determined whether the point c' is within the valid area d with the reference point a'. If the point b' is not within the valid area c, and the point c' is not within the valid area d, the point sequence is divided at the reference point a', and the point sequences into which the original point sequence is divided are separated, and are treated as different groups. If any one of the points b' and c' is not within the valid area, the point that is not within the valid area is treated as noise.

The above-described grouping process is sequentially repeated for the other estimated reflection points constituting the point sequence to group the point sequence.

Referring back to FIG. 5, in step S106, it is determined whether the point sequence that has been subjected to the noise removing process and the grouping process can be approximated by a straight line or a curve. For example, it is possible to determine whether the point sequence can be approximated from the result of determining whether there are two points or more that constitute the acquired point sequence, the result of determining whether the proportion of the points from which the distances to a candidate of the approximation straight line or a candidate of the approximation curve are less than a predetermined threshold value to all the points is equal to or greater than 50%.

If it is judged that the point sequence can be approximated, the process proceeds to step S108. On the other hand, if it is judged that the point sequence cannot be approximated, the process proceeds to step S112.

In step S108, the point sequence is approximated by using RANSAC. At this time, it is possible to select one of the straight-line approximation and the ellipse approximation, depending on the state of the assist-mode changing switch 51. For example, if the parallel-parking assist mode is selected as a result of the operation of the assist-mode changing switch 51 (see FIG. 3), it is assumed that the point sequence obtained from the output from the sonar 50 mainly shows the position of a side of a vehicle that has a substantially linear shape, because, in this case, the subject vehicle passes by the side of a parked vehicle. For this reason, it is determined that the proportion of the straight-line approximation region is high as compared to that of the curve approximation region. Accordingly, the point sequence is approximated by a straight line, and the sequence of points that have been excluded from the straight-line approximation is approximated by a curve.

On the other hand, if the parking-in-garage assist mode is selected (see FIG. 4), since the subject vehicle passes the front or the rear of the parked vehicle, it is determined that the proportion of the straight-line approximation region of the point sequence obtained from the output from the sonar 50 is low, and the point sequence is approximated by an ellipse.

Description will now be given of a case where fitting of the point sequence is performed by approximating the point sequence by a straight-line with the use of RANSAC, and then approximating the sequence of points that have been excluded from the straight-line approximation by a curve. More specifically, straight-line approximation is first performed by carrying out the following steps (1) to (3).

(1) A candidate of the approximation straight line is set by using two points that are randomly selected from among the points constituting the point sequence.

(2) The distances between the set candidate of the approximation straight line and the points constituting the point sequence are calculated, and the number of such points that the obtained distances are within a predetermined threshold value is derived.

(3) The above steps (1) and (2) are repeatedly performed, so that the candidate of the approximation straight line for which there are the greatest number of such points that the distances are within the threshold value, that is, the candidate of the approximation straight line with the best result of the evaluation of approximation accuracy is determined as the approximation straight line.

Next, for the sequence of points each being distant from the approximation straight line by the threshold value or more, that is, for the sequence of points that have been excluded from the straight-line approximation is approximated by a curve. As the algorithm for performing the curve approximation, the publicly-known, least squares method may be used. In addition, the point at which inclusion of the points in the straight-line approximation becomes inappropriate is selected, and is determined as a border between the straight-line approximation region and the curve approximation region.

A case where the point sequence is approximated by an ellipse by using RANSAC is different from the case of the above-described straight-line approximation in that an approximation ellipse is used instead of the straight line. With regard to the other points, the ellipse approximation is the same as or similar to the above-described straight-line approximation, and redundant description will be omitted.

In step S110, the points constituting the point sequence are shifted onto the approximation straight line or the approximation curve, which are determined in step S108.

In step S112, whether the detected distance is equal to or greater than a predetermined value (1.5 m, for example), whether the number of distance data predicted by the data-number prediction section 42 is equal to or less than a predetermined number, and whether the data range predicted by the data-range prediction section 43 is equal to or smaller than a predetermined value, are determined. If all these conditions are denied, it is judged that it is possible to restore the shape to the original state by performing the rotational correction, and the process proceeds to step S114. On the other hand, if any one of these conditions is true, it is judged that it is impossible to restore the shape to the original state by performing the rotational correction, the process exits for the time being.

Figure 10:
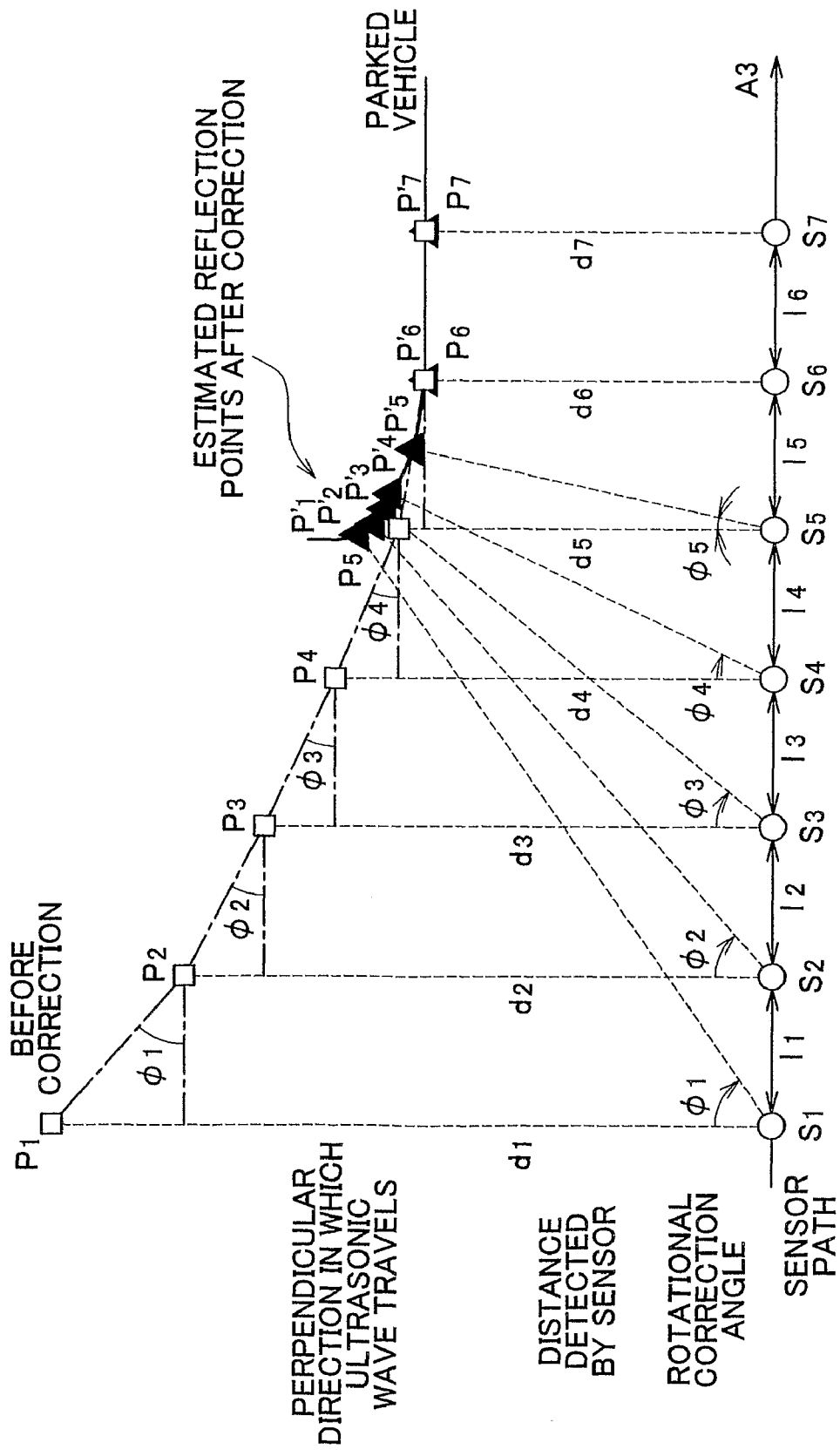
FIG. 10 is a diagram for explaining a rotational correction method.

In step S114, the angles for the rotational correction of the estimated reflection points constituting the point sequence are calculated. More specifically, as shown in FIG. 10, a rotational correction angle $\phi_n$ is calculated for each estimated reflection point $P_n$ by using the following equation (3), using the fact that the ratio of the amount of change in the detected distance $d_n$ to the movement amount $I_n$ of the sonar 50 is nearly equal to the tangent with respect to the direction normal to the surface of the object (the tangent of the angle between the line normal to the object surface and the perpendicular to the travel path of the sonar 50 passing through the relevant, estimated reflection point, in the plane of FIG. 10). The rotational correction of each estimated reflection point $P_n$ is performed in step S116, based on the calculation result.

$$\text{Rotational correction angle } \phi_n = a\tan\{(d_{n+1}-d_n)/I_n\} \quad (3)$$

where n is a natural number.

In FIG. 10, $S_n$ shows the change in position of the sonar 50 made when the vehicle travels in a direction from the left to the right (the direction shown by the arrow A3) in FIG. 10. In addition, in FIG. 10, the marks "□" represent the estimated reflection points determined from the detected distance outputted from the sonar 50. As described above, in this embodiment, the point distant, by the detected distance, from the subject vehicle (i.e. the sonar 50) in the direction perpendicular to the travel direction of the subject vehicle is defined as the estimated reflection point $P_n$.

For example, if the detected distance obtained when the sonar 50 is positioned at S1 is d1, the estimated reflection point before correction is P1. If the detected distance obtained when the sonar 50 is positioned at S2 is d2, the estimated reflection point before correction is P2. Description will now be given of a method of calculating the correction angle by using the two points as examples. First, the detected distances d1 and d2, and the movement amount I1 that is the interval between S1 and S2 are substituted into the above equation (3) to calculate the rotational correction angle $\phi1$. Next, an estimated reflection point P1' after rotational correction is obtained by rotating the estimated reflection point P1 toward the travel direction by the calculated rotational correction angle φ1.

The point sequence constituted of the estimated reflection points $P_n'$ after rotational correction can be obtained by performing the similar rotational correction for the other estimated reflection points $P_n$. If the ratio of the amount of change in the detected distance $(d_{n+1}-d_n)$ to the movement amount $I_n$ is decreasing, the direction of the rotational correction is toward the travel direction. On the other hand, if the ratio thereof is increasing, the direction of the rotational correction is opposite to the travel direction. The estimated reflection points $P_n'$ after rotational correction are represented by "▲" in FIGS. 6 and 7. As shown in FIGS. 6 and 7, the estimated reflection points $P_n'$ after rotational correction more accurately correspond to the real position of the parked vehicle as compared to the estimated reflection points $P_n$ before correction.

Figure 11:
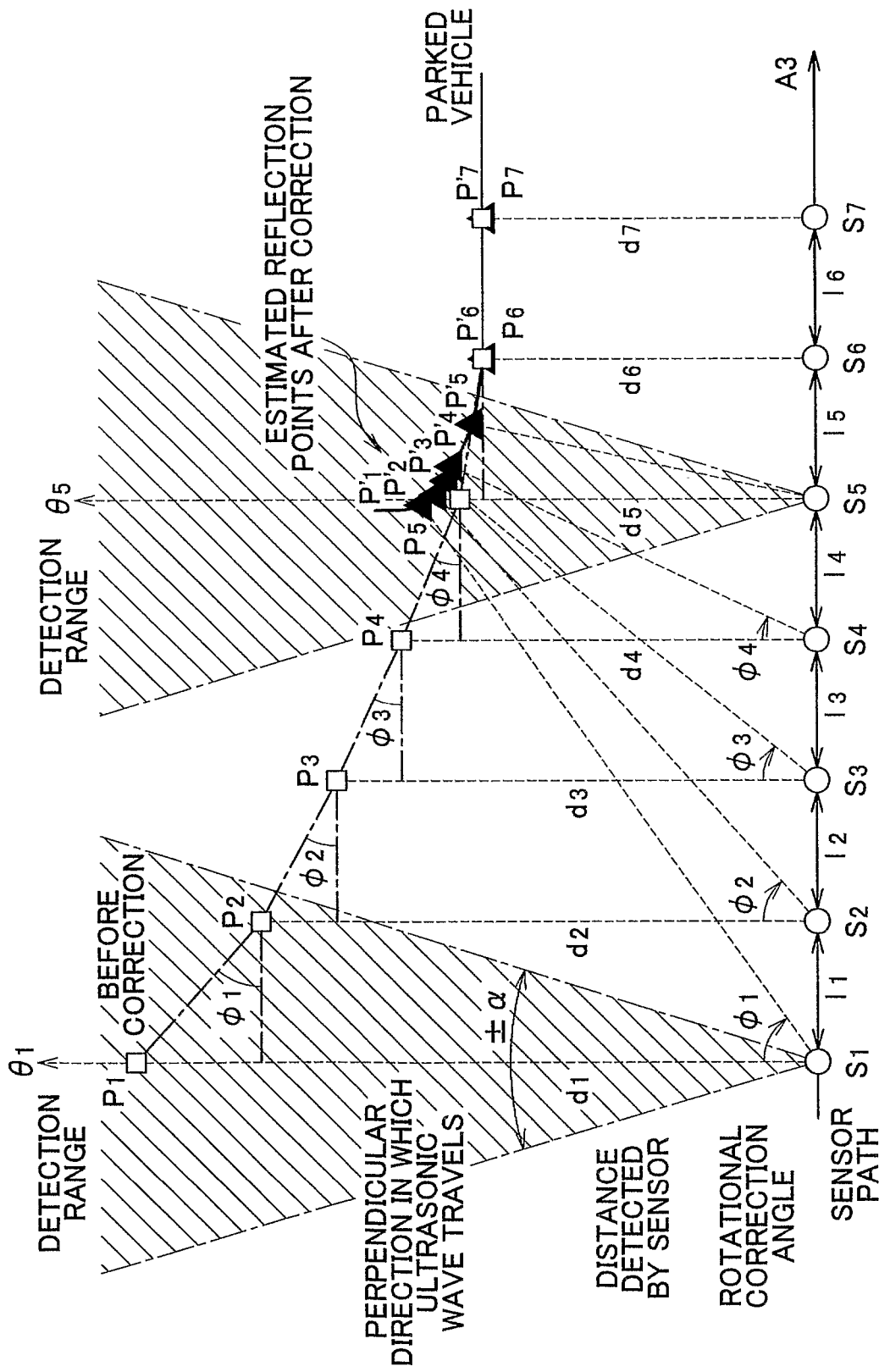
FIG. 11 is a diagram for explaining a method of preventing erroneous detection of reflection points by using rotational correction.

When the rotational correction process is performed, whether the estimated reflection points $P_n'$ after rotational correction are within the range in which detection can be performed by the sonar 50 is taken into consideration. Description will be given with reference to FIG. 11. Since the estimated reflection point P1' after correction is not within the detection range of the sonar 50 (the hatched area in FIG. 11), the detection result is judged to be incorrect. On the other hand, since the estimated reflection point P5' after correction is within the detection range of the sonar 50, the detection result is judged to be correct. For the other estimated reflection points $P_n'$, judgment is made similarly.

Figure 12:
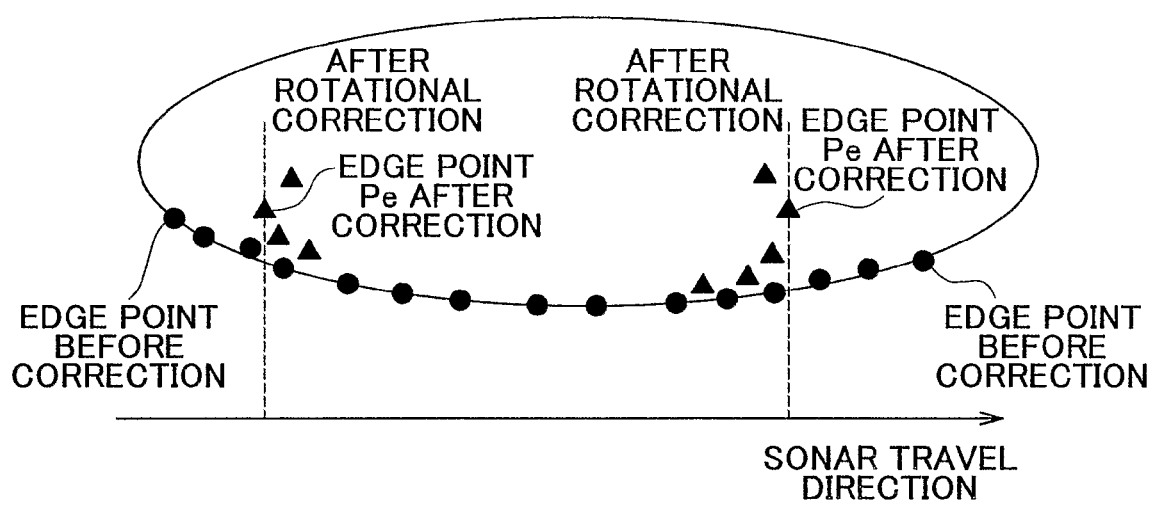
FIG. 12 is a diagram for explaining a method of estimating positions of edge portions of an object.

In addition, in this step, edge points of the parked vehicle are estimated. Description will be given with reference to FIG. 12. Outermost, estimated reflection points $P_n'$ after correction with respect to the travel direction of the sonar 50 are assumed as the edge points Pe of the parked vehicle. The edge points Pe of the parked vehicle thus obtained are represented by "●" in FIGS. 6 and 7.

According to this embodiment, the rotational correction angle $\phi_n$ is calculated, using the fact that the ratio of the amount of change in the detected distance $d_n$ to the movement amount $I_n$ of the sonar 50 is nearly equal to the tangent with respect to the direction normal to the surface of the object. Thereafter, each estimated reflection point $P_n$ is subjected to the rotational correction based on the calculation result. Accordingly, it is made possible to detect the position and the size of the parked vehicle or the like more accurately without the influence of the fluctuation in the detection range of the sonar 50.

According to this embodiment, when the rotational correction process is performed, whether the estimated reflection points $P_n'$ after rotational correction are within the range in which detection can be performed by the sonar 50 is taken into consideration. If an estimated reflection point $P_n'$ after rotational correction is not within the range in which detection can be performed by the sonar 50, the detection result is judged to be incorrect. As a result, it is made possible to prevent erroneous detection.

According to this embodiment, outermost, estimated reflection points $P_n'$ after rotational correction with respect to the travel direction of the sonar 50 are assumed as the edge points of the parked vehicle. Accordingly, it is made possible to prevent the width of the parked vehicle from being less than the real value thereof when the width of the parked vehicle is determined based on the estimated reflection points $P_n'$ after rotational correction.

Figure 13:
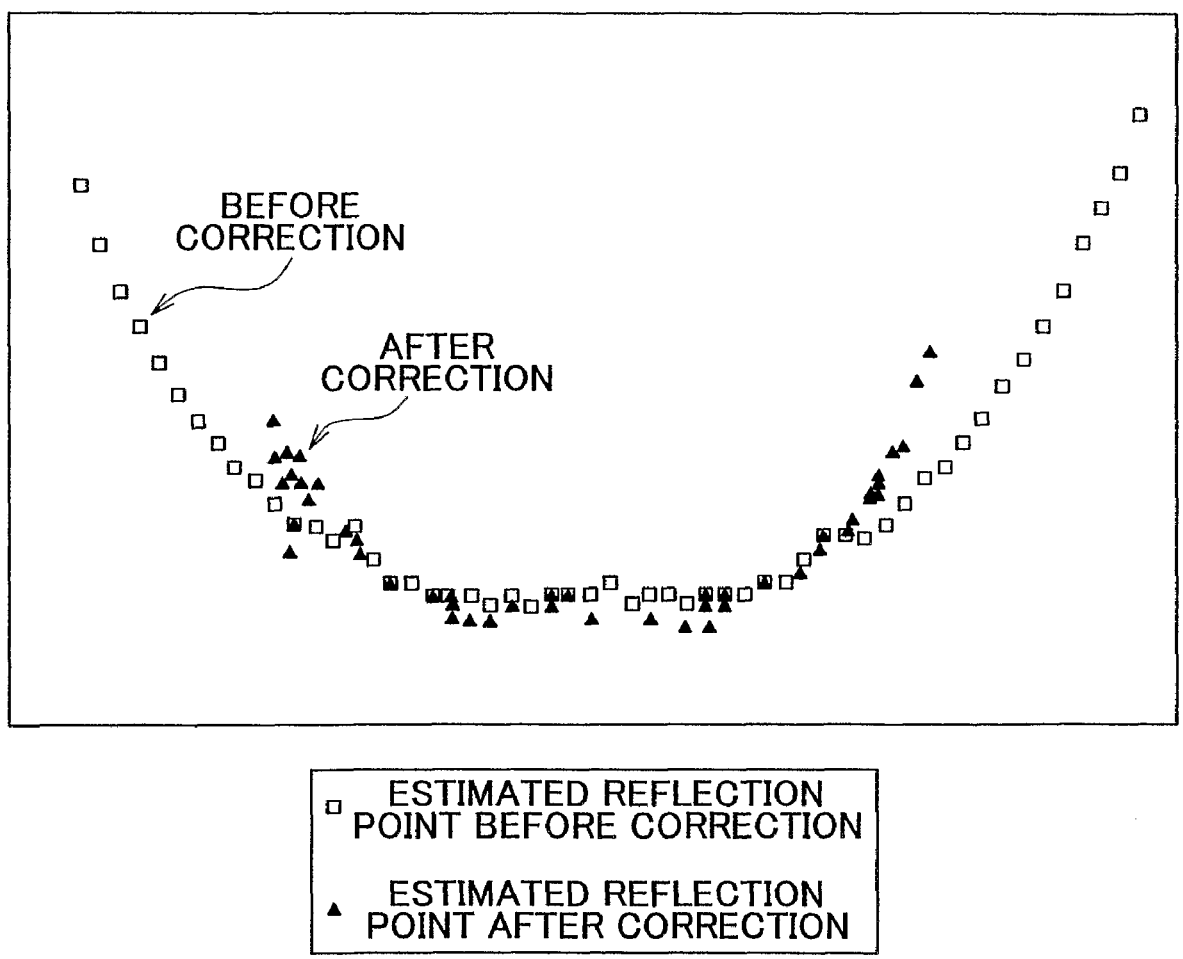
FIG. 13 is a diagram showing a correction result obtained when rotational correction is performed without fitting an approximation curve to a point sequence.
Figure 14:
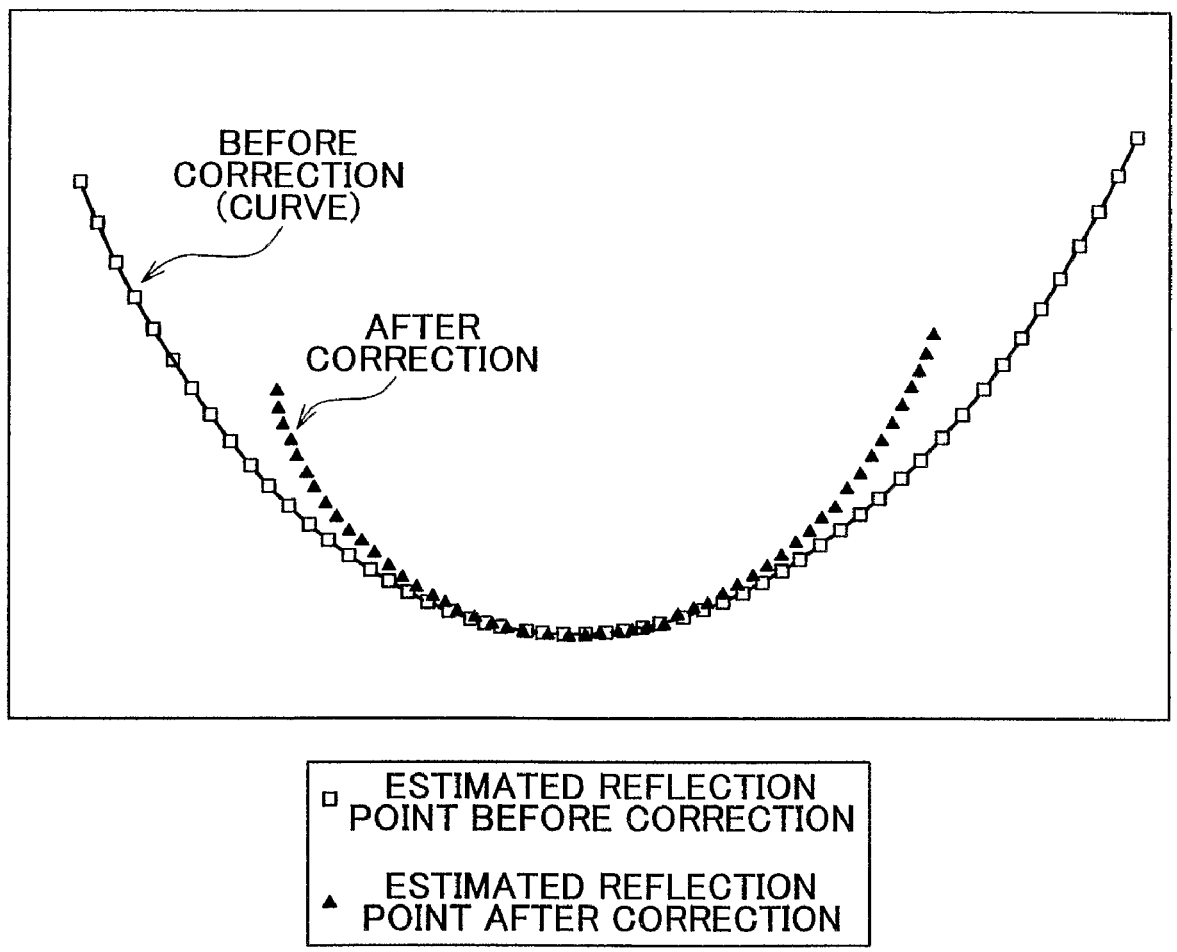
FIG. 14 is a diagram showing a correction result obtained when rotational correction is performed after an approximation curve is fitted to a point sequence.

According to this embodiment, before rotational correction is performed, the approximation straight-line or the approximation curve is fitted to the point sequence obtained from the output from the sonar 50. As a result, it is made possible to eliminate the variation in data due to noise and/or measurement errors. An example of the correction result obtained when the rotational correction is performed without fitting the approximation curve to the point sequence, is shown in FIG. 13. A correction result obtained when the rotational correction is performed after an approximation curve is fitted to the same data as that of FIG. 13, is shown in FIG. 14. In FIGS. 13 and 14, the marks "□" represent the estimated reflection points $P_n$ before rotational correction, and the marks "▲" represent the estimated reflection points $P_n'$ after rotational correction. If the fitting of the point sequence is not performed, the noise not removed and the variation in data due to measurement errors would have an influence on the point sequence after rotational correction, and the point sequence after rotational correction would not be aligned along a smooth curve. On the other hand, if the rotational correction is performed after the fitting of the point sequence is performed, noise and the variation in data is removed, and, as shown in FIG. 14, it has been proven that a smooth curve can be obtained.

According to this embodiment, it is judged that it is impossible to restore the shape to the original state by performing the rotational correction, and the rotational correction process is interrupted, if any one of the following conditions is true: the detected distance outputted from the sonar 50 is equal to or greater than the predetermined value; the number of detected-distance data is equal to or less than the predetermined number; and the range of the detected data is equal to or smaller than the predetermined value. In other words, the rotational correction is stopped when the rotational correction cannot be appropriately performed, so that it is made possible to keep an inappropriate correction from being performed.

Figure 15:
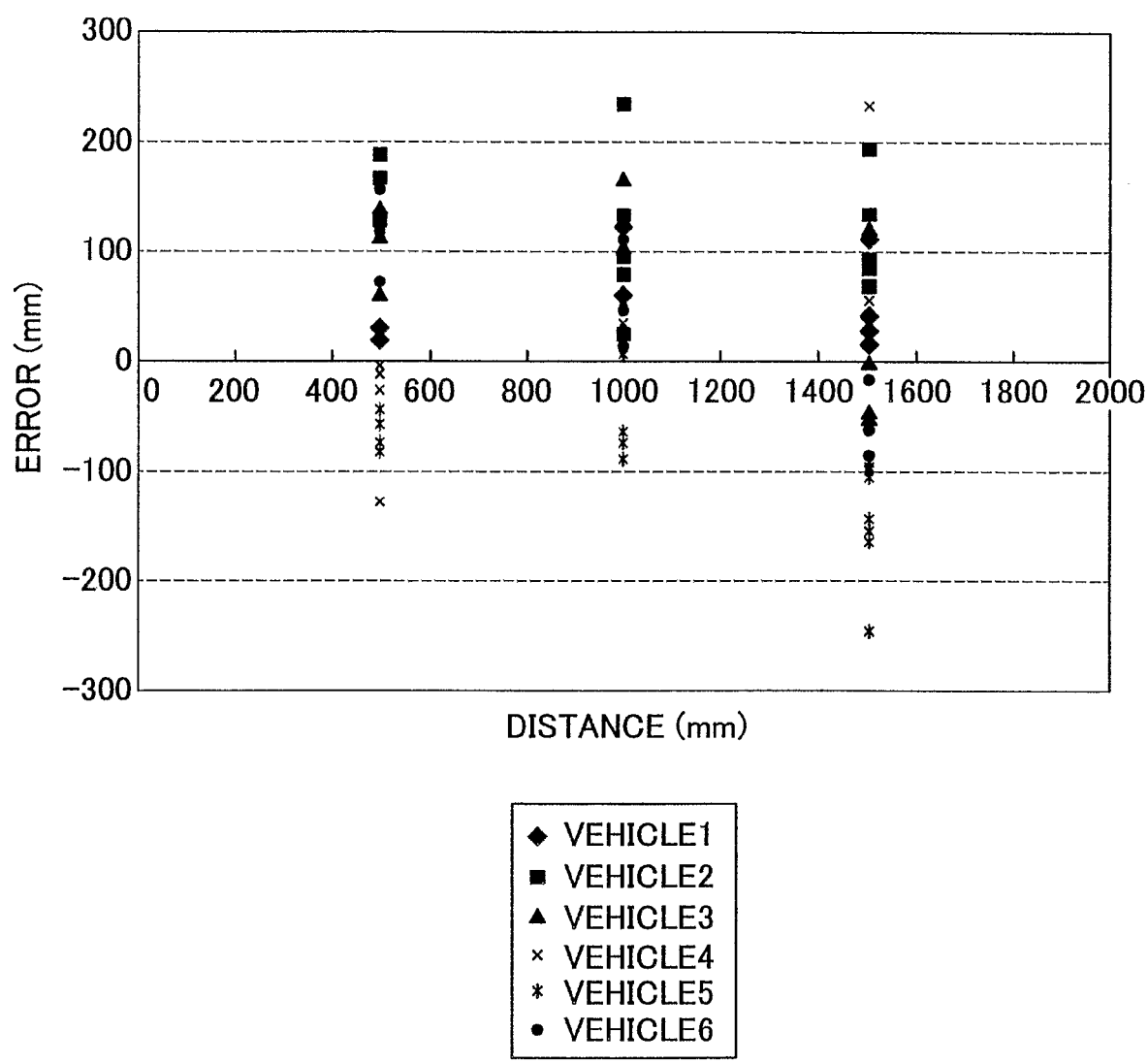
FIG. 15 shows actual measurement data showing relations between detected distances and detection errors.
Figure 16:
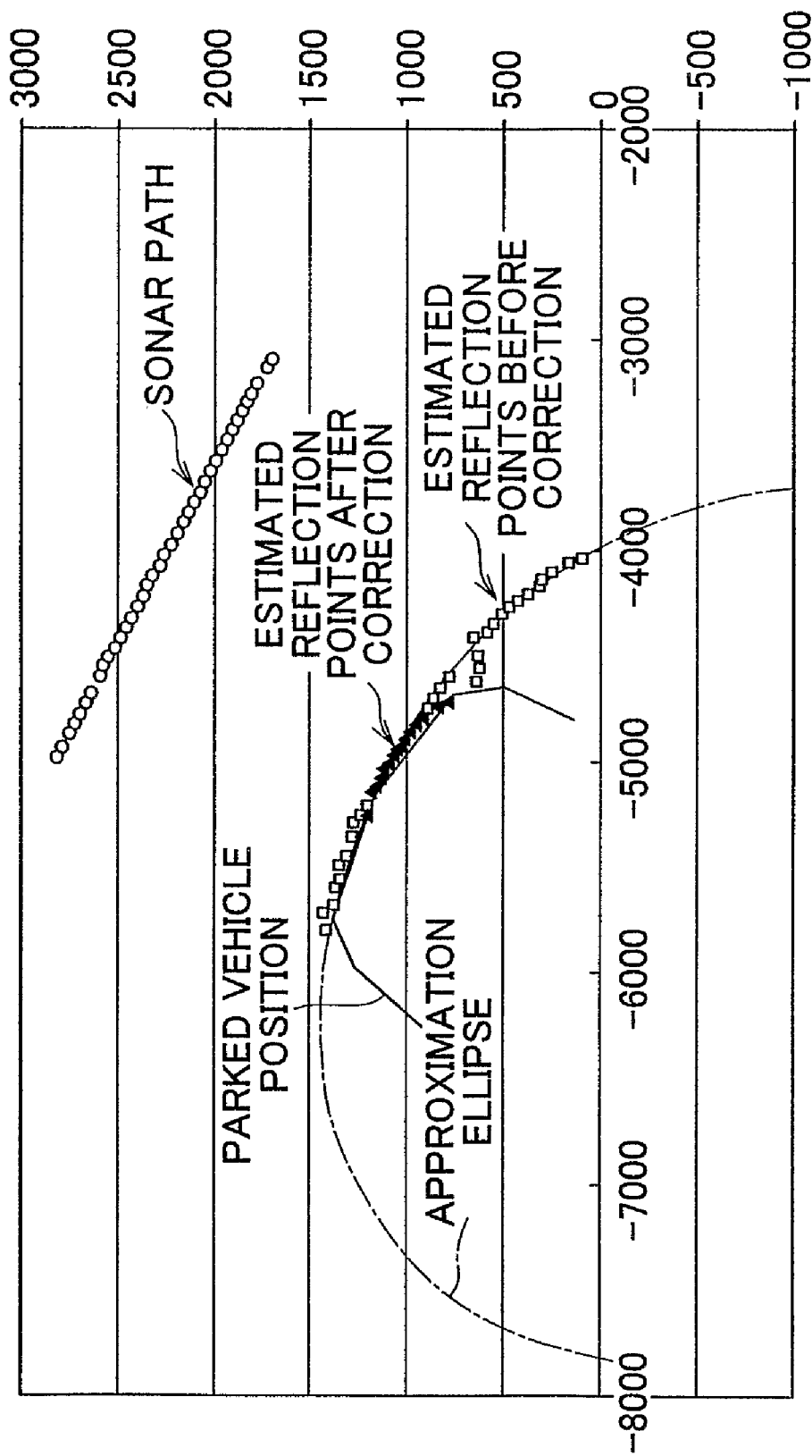
FIG. 16 is a diagram showing an example of a point sequence obtained from the detection results outputted from the sonar under a condition where the distance from a detected object is large, and an example of a point sequence after rotational correction.

Relations between the detected distances and the detection errors are shown in FIG. 15. The horizontal axis and the vertical axis in FIG. 15 represent the detected distance and the detection error, respectively. As shown in FIG. 15, the larger the detected distance is, the greater the variation in the measurement errors is. In addition, since the number of detected-distance data decreases as the detected distance becomes large, it accordingly becomes difficult to restore the shape to the original state by performing the rotational correction. An example of the point sequence obtained from the detection results outputted from the sonar 50 under a condition where the distance from the parked vehicle is large (1.5 m), and an example of the point sequence after rotational correction is shown in FIG. 16. In FIG. 16, the estimated reflection points $P_n'$ after rotational correction are represented by "▲", and the edge points Pe are represented by "●". As shown in FIG. 16, when the distance from the parked vehicle is large, the shape is not completely restored to the original state by the rotational correction. In addition, the errors of the edge points Pe are large. According to this embodiment, as described above, since the rotational correction is stopped in such a case, it is possible to keep the rotational correction from being performed in an inappropriate state.

Although, in the above-described embodiment, the rotational correction angle $\phi_n$ is calculated using the arc tangent (the equation (3)), the present invention is not limited to this. It is also possible "to correct the reflection points so that the angle between the travel path of the sonar and the straight line connecting the position of the sonar and the reflection point is made smaller as the ratio of the amount of change in the detected distance to the travel distance of the sonar increases" by using another function (such as the arc sine) that has the characteristics similar to those of the arc tangent function.

Still another method can be used in which the reflection points are corrected using a map that has the characteristics similar to those of the equation (3), for example. In these cases, the effects similar to those obtained by the above embodiment can be obtained.

Although, in the above-described embodiment, RANSAC is used as the algorithm for approximating the point sequence by a straight line or an ellipse, the present invention is not limited to this. The straight-line approximation and the ellipse approximation may be performed using another approximation method, such as the least square method. In addition, the figure by which the point sequence is approximated is not limited to a straight line or an ellipse. The point sequence may be approximated by another figure, such as a quadratic curve.

While embodiments of the invention have been described, the invention is not limited to the above-described embodiments, and various modifications can be made to the invention. With regard to the above-described embodiments, the invention is applied to a parking assist system. The invention, however, can also be applied to systems other than the parking assist system, and can also be used alone.

The invention claimed is:

1. An object detection apparatus, comprising:
a distance detection device that transmits a detection wave, and detects a distance from an object that reflects the detection wave, based on a state of reflection of the detection wave;
a movement-amount detection device that detects an amount of movement of the distance detection device; and
a reflection-point estimation device that estimates a reflection point of the detection wave based on the distance from the object detected by the distance detection device and the movement amount of the distance detection device detected by the movement-amount detection device,
wherein the reflection-point estimation device corrects the reflection point so that, when the reflection point is projected onto a travel path of the distance detection device, the projected reflection point is located further from a position of the distance detection device as a ratio of an amount of change in the distance from the object to the movement amount of the distance detection device increases.

2. The object detection apparatus according to claim 1, wherein the reflection-point estimation device corrects the reflection point so that an angle between the travel path of the distance detection device and a straight line connecting the position of the distance detection device and the reflection point is made smaller as the ratio of the amount of change to the movement amount increases.

3. The object detection apparatus according to claim 1, wherein, if the reflection point after correction is not within a range in which detection can be performed by the distance detection device, the reflection-point estimation device judges that a detection result is incorrect.

4. The object detection apparatus according to claim 1, wherein the reflection-point estimation device assumes an outermost reflection point after correction with respect to a travel direction of the distance detection device as an edge point of the object.

5. The object detection apparatus according to claim 1, wherein, if the distance from the object detected by the distance detection device is equal to or greater than a predetermined value, the reflection-point estimation device does not correct the reflection point.

6. The object detection apparatus according to claim 1, further comprising:
a data-number prediction device that predicts a number of distance data corresponding to the object to be detected by the distance detection device, wherein, if the number of distance data predicted by the data-number prediction device is equal to or less than a predetermined number, the reflection-point estimation device does not correct the reflection point.

7. The object detection apparatus according to claim 6, wherein the data-number prediction device predicts the number of distance data to be detected by the distance detection device, based on a detection cycle of the distance detection device, a travel speed of the distance detection device, and a size of the object.

8. The object detection apparatus according to claim 1, further comprising:
a data-range prediction device that predicts a data range of distance data corresponding to the object to be detected by the distance detection device,
wherein, if the data range predicted by the data-range prediction device is equal to or smaller than a predetermined value, the reflection-point estimation device does not correct the reflection point.

9. The object detection apparatus according to claim 8, wherein the data-range prediction device predicts the data range, based on a detection cycle of the distance detection device, a travel speed of the distance detection device, and a size of the object.

10. The object detection apparatus according to claim 1, wherein the reflection-point estimation device approximates a sequence of reflection points by one of a straight line or a curve.

11. The object detection apparatus according to claim 10, wherein, when performing the approximation, the reflection-point estimation device repeatedly performs random setting of a candidate of the straight line or the curve, and evaluation of approximation accuracy of the candidate of the straight line or curve, using the distances between the candidate of the straight line or the curve and the points constituting the point sequence, and selects the candidate of the straight line or the curve with the best result of the evaluation of approximation accuracy as the approximation straight line or curve.

12. The object detection apparatus according to claim 1, wherein the reflection-point estimation device calculates a rotational correction angle $\phi_n$ for each reflection point $P_n$ by using the following equation, and performs rotational correction of each reflection point $P_n$, based on the calculation result:

Rotational Correction Angle $\phi_n = \operatorname{atan}\{(d_{n+1} - d_n)/I_n\}$ where $I_n$ is the amount of movement of the distance detection device, $d_n$ is the distance from the object, and n is a natural number.

13. A vehicle in which the object detection apparatus according to claim 6 is installed, wherein the distance detection device is a sonar, and
wherein the travel speed of the distance detection device is vehicle speed.

14. An object detection method, comprising:
a distance detection step of transmitting a detection wave, and detecting a distance from an object by using a distance detection device that detects the distance from the object that has reflected the detection wave, based on a state of reflection of the detection wave;
a movement-amount detection step of detecting an amount of movement of the distance detection device; and a reflection-point estimation step of estimating a reflection point of the detection wave based on the distance from the object detected in the distance detection step and the movement amount of the distance detection device detected in the movement-amount detection step, wherein, in the reflection-point estimation step, the reflection point is corrected so that, when the reflection point is projected onto a travel path of the distance detection device, the projected reflection point is located further from a position of the distance detection device as a ratio of an amount of change in the distance from the object to the movement amount of the distance detection device increases.

15. The object detection method according to claim 14, wherein, in the reflection-point estimation step, the reflection point is corrected so that an angle between the travel path of the distance detection device and a straight line connecting the position of the distance detection device and the reflection point is made smaller as the ratio of the amount of change to the movement amount increases.

16. The object detection method according to claim 14, wherein, in the reflection-point estimation step, if the reflection point after correction is not within a range in which detection can be performed by the distance detection device, the detection result is judged to be incorrect.

17. The object detection method according to claim 14, wherein, in the reflection-point estimation step, an outermost reflection point after correction with respect to a travel direction of the distance detection device is assumed as an edge point of the object.

18. The object detection method according to claim 14, wherein, in the reflection-point estimation step, if the distance from the object detected by the distance detection device is equal to or greater than a predetermined value, the reflection point is not corrected.

19. The object detection method according to claim 14, further comprising:
a data-number prediction step of predicting a number of distance data corresponding to the object to be detected by the distance detection device,
wherein, in the reflection-point estimation step, if the number of distance data predicted in the data-number prediction step is equal to or less than a predetermined number, the reflection point is not corrected.

20. The object detection method according to claim 19, wherein, in the data-number prediction step, the number of distance data to be detected by the distance detection device is predicted based on a detection cycle of the distance detection device, a travel speed of the distance detection device, and a size of the object.

21. The object detection method according to claim 14, further comprising:
a data-range prediction step of predicting a data range of distance data corresponding to the object to be detected by the distance detection device,
wherein, in the reflection-point estimation step, if the data range predicted in the data-range prediction step is equal to or smaller than a predetermined value, the reflection point is not corrected.

22. The object detection method according to claim 21, wherein in the data-range prediction step, the data range is predicted based on a detection cycle of the distance detection device, a travel speed of the distance detection device, and a size of the object.

23. The object detection method according to claim 14, further comprising:
an approximation step of approximating a point sequence showing a position of the object by one of a straight line or a curve.

24. The object detection method according to claim 23, wherein, in the approximation step, random setting of a candidate of the straight line or the curve, and evaluation of approximation accuracy of the candidate of the straight line or curve, using the distances between the candidate of the straight line or the curve and the points constituting the point sequence, are repeatedly performed, and the candidate of the straight line or the curve with the best result of the evaluation of approximation accuracy is selected as the approximation straight line or curve.

25. The object detection apparatus according to claim 14, wherein, in the reflection-point estimation step, a rotational correction angle $\phi_n$ is calculated for each reflection point $P_n$ by using the following equation, and rotational correction of each reflection point $P_n$ is performed based on the calculation result:

Rotational Correction Angle $\phi_n = \mathrm{atan}\{(d_{n+1}-d_n)/I_n\}$ where $I_n$ is the amount of movement of the distance detection device, $d_n$ is the distance from the object, and n is a natural number.

26. A vehicle in which the object detection apparatus according to claim 8 is installed, wherein the distance detection device is a sonar, and
wherein the travel speed of the distance detection device is vehicle speed.

* * * * *